United States Patent [19]

Kuromaru et al.

[11] Patent Number: 4,667,551

[45] Date of Patent: May 26, 1987

[54] APPARATUS FOR CUTTING A PLATE INTO A PREDETERMINED SIZE

[75] Inventors: Hiroshi Kuromaru, Nagoya; Tadakiyo Morimoto, Takasago; Koji Kuwahara, Takasago; Kenji Fujiwara, Takasago; Yujiro Shimizu, Takasago; Reizo Miyauchi, Takasago; Kuniaki Wakusawa, Hiroshima; Hideaki Takama, Mihara; Masashi Waseda, Mihara; Akihisa Fujita, Mihara, all of Japan

[73] Assignee: Mitsubishi Jukogyo Kabushiki Kaisha, Tokyo, Japan

[21] Appl. No.: 779,565

[22] Filed: Sep. 24, 1985

[30] Foreign Application Priority Data

Sep. 25, 1984 [JP] Japan .................. 59-200077

[51] Int. Cl.$^4$ .................. B26D 1/62; B26D 5/20
[52] U.S. Cl. .................. 83/72; 83/295; 83/370
[58] Field of Search .................. 83/295, 370, 371, 72, 83/369; 364/475; 318/396–398

[56] References Cited

U.S. PATENT DOCUMENTS

| 3,424,041 | 1/1969 | Giraud . | |
|---|---|---|---|
| 3,614,572 | 10/1971 | Usher | 83/295 X |
| 3,826,169 | 7/1974 | Schnell et al. . | |
| 4,090,118 | 5/1978 | Smith | 318/396 X |
| 4,183,271 | 1/1980 | Martin | 83/295 X |
| 4,201,102 | 5/1980 | Rudszinat . | |
| 4,255,998 | 3/1981 | Rudszinat . | |
| 4,497,229 | 2/1985 | Carrington et al. | 83/295 X |

FOREIGN PATENT DOCUMENTS

E3512 10/1983 Austria .
A10078745 5/1983 European Pat. Off. .
A1463590 4/1969 Fed. Rep. of Germany .
A1318472 5/1963 France .

Primary Examiner—Frank T. Yost
Attorney, Agent, or Firm—Birch, Stewart, Kolasch & Birch

[57] ABSTRACT

A cutting apparatus cuts a plate such as a corrugated cardboard or a steel plate into a predetermined size with a knife cylinder and includes a knife cylinder driver for controlling rotation speed of the knife cylinders by motors. The apparatus includes a speed compensator for producing a torque command signal so that there is no difference between a command rotating speed and a detected motor speed and a plurality of motor torque control device including a torque compensator for producing a motor command signal by proportional control so that there is no difference between the torque command signal from the speed compensator and a torque detecting signal, power amplifiers composed of transistors and which amplify the motor command signal from the torque compensator to produce a motor applied voltage and motors, particularly brushless motors controlled by the motor applied voltage from the power amplifiers, whereby transistor type power amplifiers having excellent response of speed can be used, the cutting accuracy and high speed cutting performance for the plate can be improved, and the proportional control is adopted to the torque compensator so that the dispersion of load to the motors is minimized.

6 Claims, 4 Drawing Figures

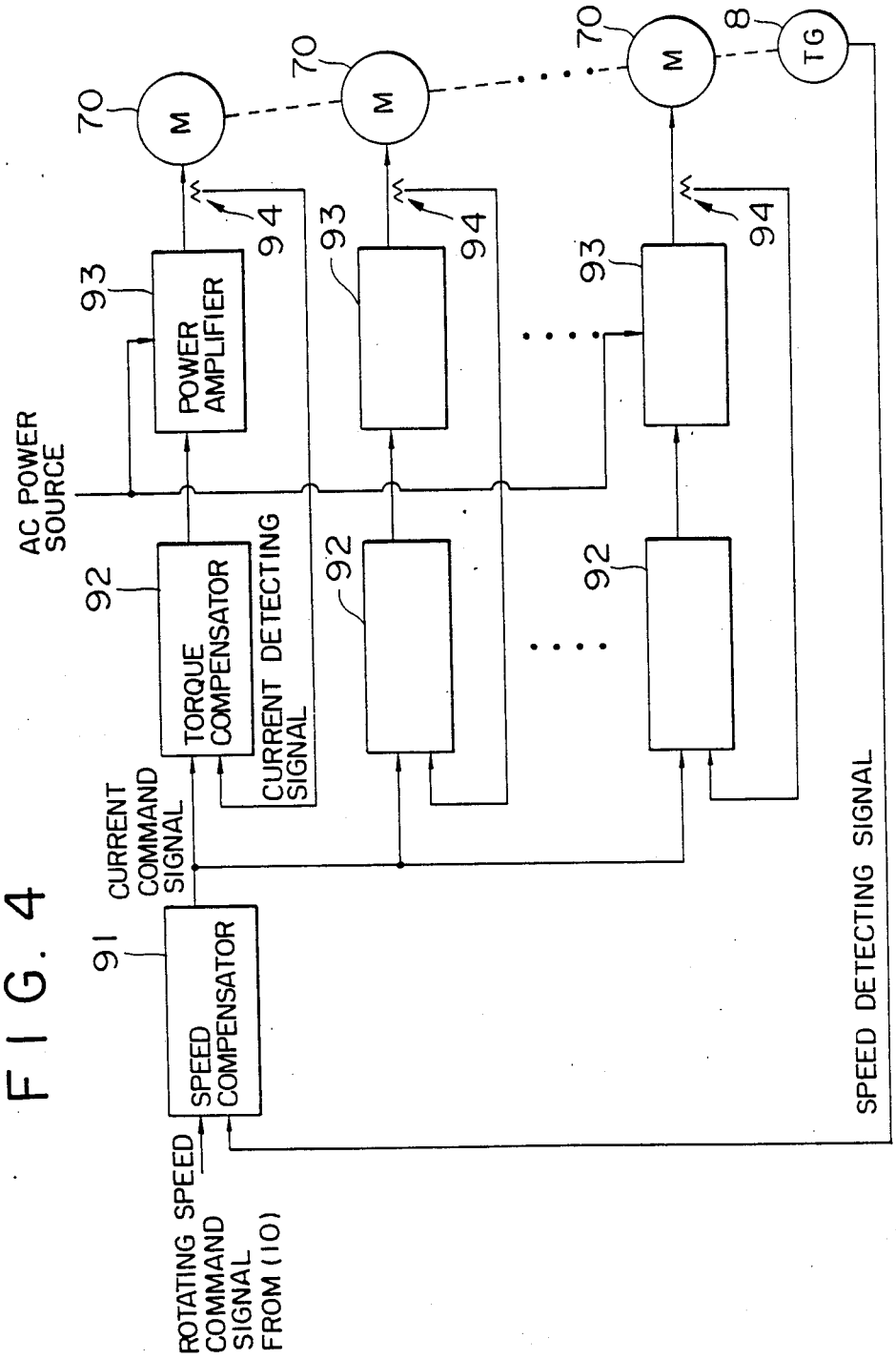

APPARATUS FOR CUTTING A PLATE INTO A PREDETERMINED SIZE

BACKGROUND OF THE INVENTION (i) Field of the Invention

The present invention relates to an apparatus for cutting a plate such as a corrugated cardboard or a steel plate into a predetermined size, and more particularly to an apparatus for cutting the plate with improved cutting accuracy and high-speed cutting performance.

(ii) Description of the Prior Art

FIG. 2 shows a simple configuration of an apparatus for cutting corrugated cardboard into a predetermined size. In FIG. 2, numeral 1 denotes corrugated cardboard which moves in a direction shown by an arrow. Numerals 2 denote knife cylinders which rotate in the directions indicated by the arrows so that edges of upper and lower knives are brought together on the cardboard 1 to cut the cardboard 1. Numeral 3 denotes a wheel for measuring a moving speed of the cardboard 1. Numeral 4 denotes a cardboard moving speed detector which generates a speed signal in response to a rotation of the wheel 3. Numeral 5 denotes a rotational angle detector for measuring a rotational movement of the knife cylinders 2. Numeral 6 denotes reduction gears for coupling the knife cylinders 2 and a motor 7. Numeral 8 denotes a motor speed detector for measuring a rotating speed of the motor 7. Numeral 11 denotes a cut length setting unit of the cardboard. Numeral 10 denotes a motor speed command signal generator which is supplied with a cutting command from the cut length setting unit 11, a cardboard moving speed signal from the cardboard moving speed detector 4 and a knife cylinder rotational angle signal from the knife cylinder rotational angle detector 5 and generates a rotating speed command signal for the motor 7. Numeral 9 denotes a speed control device which generates a motor applied voltage so that the rotating speed command signal from the motor speed command generator 10 is equal to a speed detecting signal from the speed motor detector 8. The speed control device 9, the motor 7 and the motor speed detector 8 form a knife cylinder driver.

FIG. 3 shows a configuration of the driver. In FIG. 3, numeral 91 denotes a speed compensator responsive to a difference between the rotating speed command signal from the motor speed command signal generator 10 and the speed detecting signal from the motor speed detector 8 to produce a torque command signal so that there is no difference. Numeral 92 denotes a torque compensator which is responsive to a difference between the torque command signal from the speed compensator 91 and a torque detecting signal from a motor torque detector 94 to produce a motor armature voltage command signal by a propotional-plus-integral control (referred to as PI control) or a proportional-plus-integral-plus-derivative control (referred to as PID control) so that there is no difference. Numeral 93 denotes a power amplifier composed of a thyristor which amplifies the motor armature voltage command signal from the torque compensator 92 and produces the motor applied voltage.

Such a prior art apparatus requires electric power of several tens kW or more as electric power of driving the knife cylinders. More particularly, when the speed control of the motor 7 is attained by the power amplifier 93 in order to process large electric power, the phase angle control using a thyristor is required. In this case, while the phase angle control using the thyristor is generally used in application requiring high speed response, the frequency response of the phase angle control is limited by a frequency of the power source. Accordingly, the frequency response is deteriorated in the phase control of the AC power source. For example, the frequency response band is about 15 Hz in the phase angle control using a three phase full-wave rectification and higher responsive characteristic can not be attained. Accordingly, there is a limitation in cutting accuracy and high speed cutting performance.

In order to enhance the speed response of the knife cylinders 2, it is necessary to use a motor having a special structure in which the inertia of the armature of the motor 7 is reduced.

SUMMARY OF THE INVENTION

The present invention has been made in view of the above drawback and an object of the present invention is to provide an apparatus for cutting a plate into a predetermined size with improved cutting accuracy and high speed cutting performance.

In order to achieve the above object, the configuration of the present invention resides in an apparatus for cutting a plate into a predetermined size with knife cylinders and including knife cylinder drive means for controlling the rotation speed of the knife cylinders by motors, characterized by the provision of speed compensating means for producing a torque command signal so that there is no difference between a command rotating speed and a detected motor speed and a plurality of motor torque control means including torque compensating means for producing a motor command signal by proportional control so that there is no difference between a torque command signal from the speed compensating means and a torque detecting signal, power amplifying means including a transistor and for amplifying a motor command signal from the torque compensating means to produce a motor applied voltage and motors controlled by the motor applied voltage from the power amplifying means.

Since the present invention includes the above configuration, the following effects are attained.

A transistor type power amplifier having an excellent response of speed can be used and the speed response (cutting accuracy and high speed cutting performance) can be improved. The torque compensator adopts the proportional control so that the dispersion of load to motors can be reduced. Brushless motors are used to prevent deterioration of maintenance due to increased motors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 shows a knife cylinder driver according to the present invention.

DETAILED DESCRIPTION OF A PREFERRED EMBODIMENT

Figure 1:
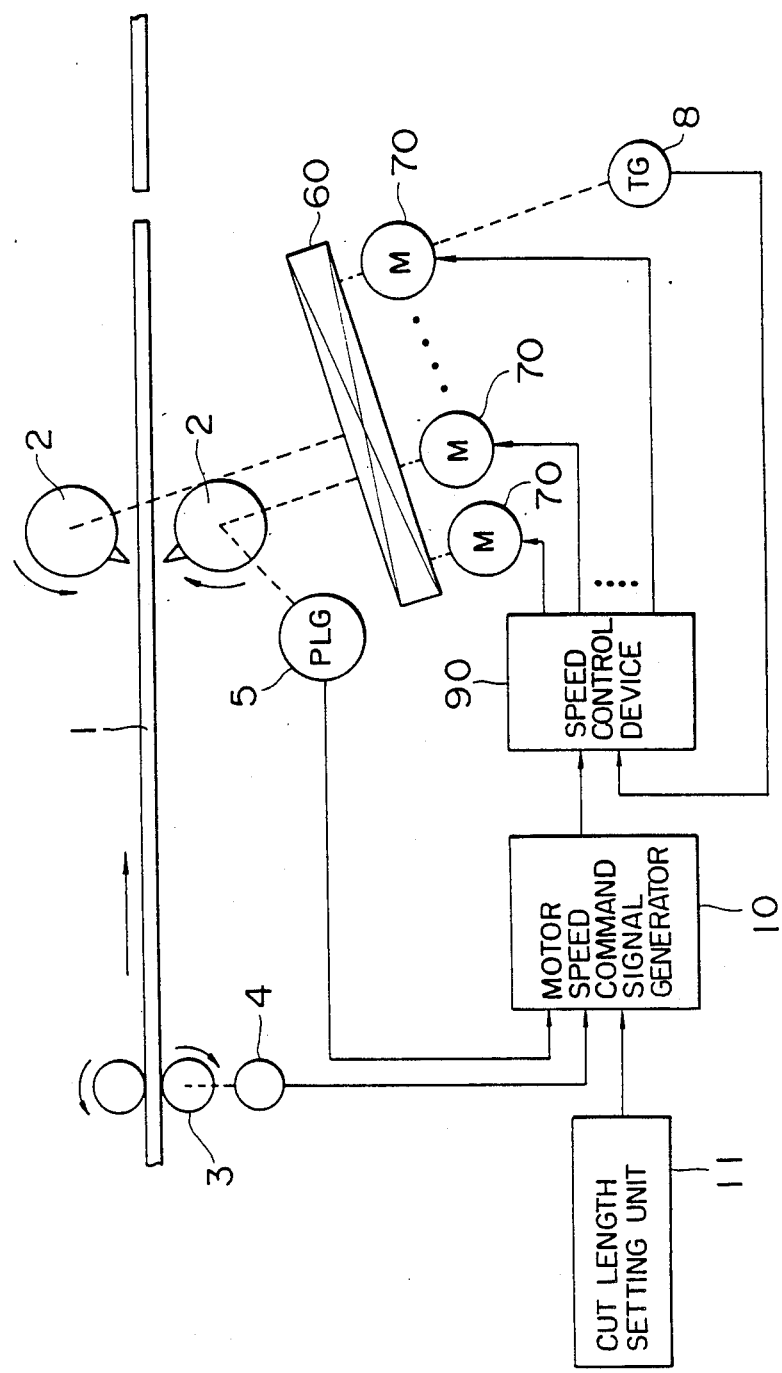
FIG. 1 shows a configuration of an embodiment according to the present invention.
Figure 2:
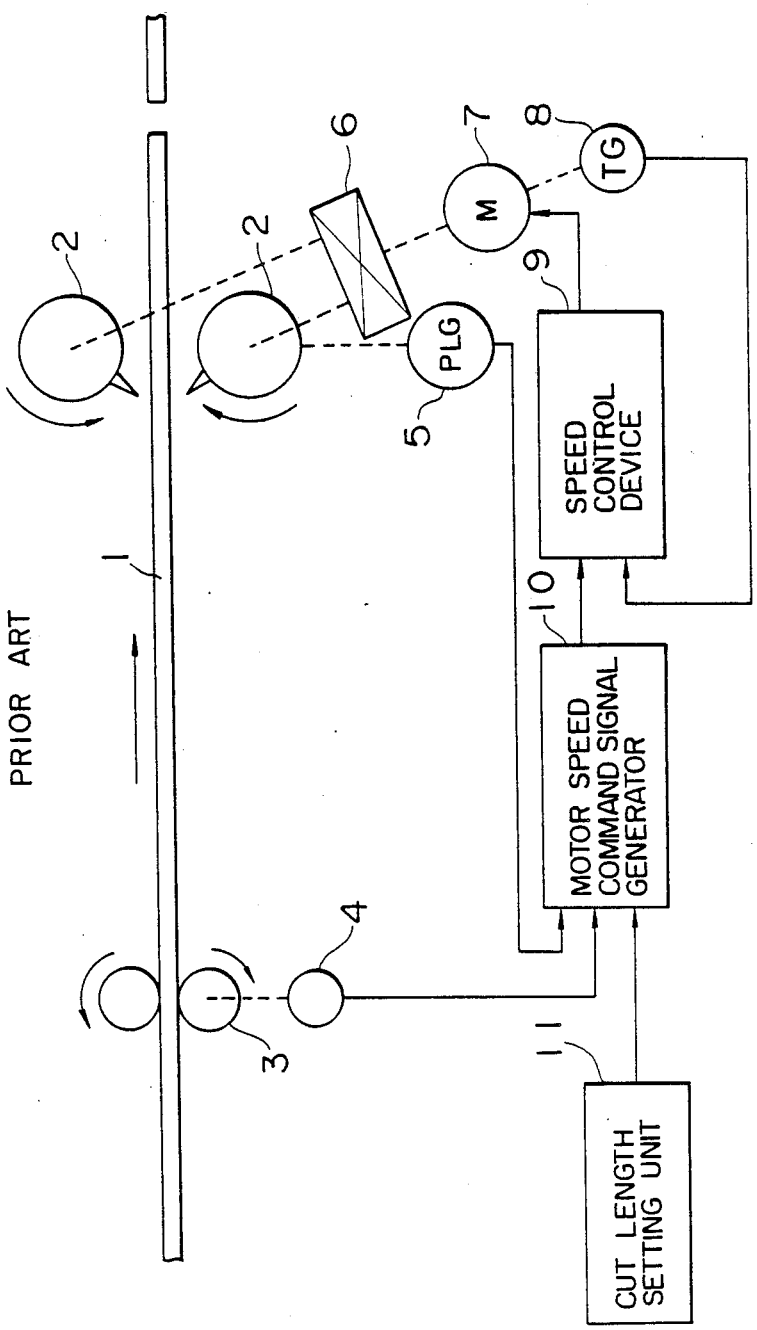
FIG. 2 shows a prior art configuration art.
Figure 3:
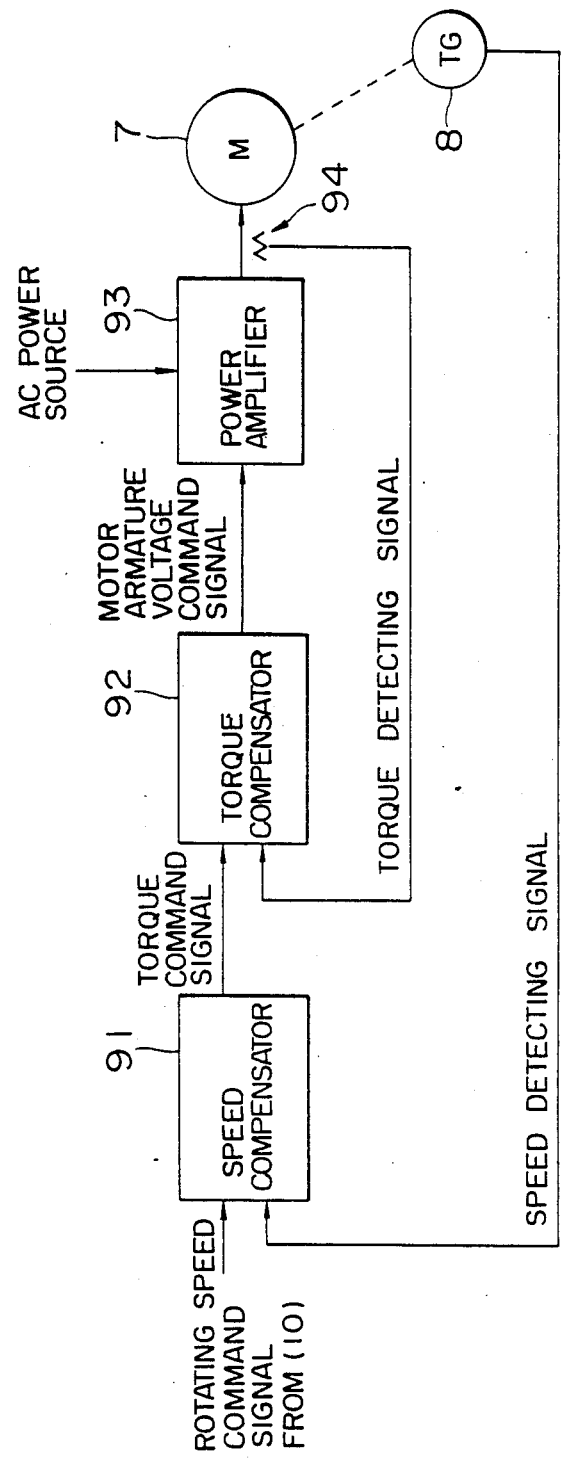
FIG. 3 shows a prior art configuration of a knife cylinder driver.

Referring to FIGS. 1 and 4, an embodiment of the present invention will now be described. The like numerals shown in FIGS. 2 and 3 designate the same elements in FIGS. 1 and 4. In FIG. 1, numeral 1 denotes corrugated cardboard which moves in a direction shown by an arrow. Numeral 2 denotes knife cylinders which rotate the directions indicated by the arrows so that edges of upper and lower knives are brought together on the cardboard 1 to cut the cardboard 1. Numeral 3 denotes a wheel for measuring a moving speed of the cardboard 1. Numeral 4 denotes a cardboard moving speed detector which generates a speed signal in response to a rotation of the wheel 3. Numeral 5 denotes a knife cylinder rotational angle detector for measuring a rotational movement of the knife cylinders 2. Numeral 60 denotes a reduction gear mechanism for coupling the knife cylinders 2 and a plurality of motors 70. The gear mechanism 60 transmits the rotation of all the motors 70 to the knife cylinders 2 and reduces the load to each motor 70 according to the number of motors 70. Since a plurality of motors 70 are used, brushless motors, for example, are used to improve the maintenance. Numeral 8 denotes a motor speed detector for measuring the rotating speed of the motor 70. Numeral 11 denotes a cut length setting unit for the cardboard. Numeral 10 denotes a motor speed command signal generator which is supplied with a cutting command signal from the cut length setting unit 11, a cardboard moving speed signal from the cardboard moving speed detector 4 and a knife cylinder rotational angle signal from the knife cylinder rotational angle detector 5 to produce a rotating speed command signal for the plurality of motors 70. Numeral 90 denotes a speed control device for producing a motor applied voltage so that the rotating speed command signal from the motor speed command signal generator 10 is equal to the speed detecting signal from the motor speed detector 8. The speed control device 90, the motors 70 and the motor speed detector 8 form a knife cylinder driver.

FIG. 4 shows a configuration of the knife cylinder driver. The speed control device 90 shown in FIG. 1 comprises a speed compensator 91, a plurality of torque compensators 92 and power amplifiers 93 each disposed correspondingly to the motors 70. The speed compensator 91 is responsive to a difference between the rotating speed command signal from the motor speed command signal generator 10 and the speed detecting signal from the motor speed detector 8 to produce the torque command signal so that the difference is minimized to zero. The torque compensator 92 produces a motor armature voltage command signal in response to a difference between the torque command signal from the speed compensator 91 and a torque detecting signal from a motor torque detector 94 so that the difference is minimized to zero. The torque compensator 92 adopts the proportional control (P control) having self-balance characteristic. Accordingly, the drift quantity and the offset quantity in the whole control loop can not be compensated in the control system as in the prior art using the integral control (I control) having astatic characteristic. However, elements used are carefully selected and the gain for the proportional control is set so that the control error enters into a predetermined range. However, when the I control having the astatic characteristic is adopted to a plurality of torque compensators 92, the dispersion of torque born on each motor is exessive and there is a possibility that a rated torque of the motors is exceeded. Accordingly, the propotional control can suppress the dispersion of torque born on each motor. The power amplifiers 93 are power amplifiers which use transistors and amplify the motor armature voltage command signal from the torque compensators 92 to produce the motor applied voltage. The same number of power amplifiers 93 as that of the torque compensators 92 are used. The reason why the transistors are used in the power amplifiers 93 is that the speed response performance is not limited by a frequency of the power source since the transistors have self-arc-extinguishing characteristic differing from thyristors. Accordingly, the frequency response performance can be improved by ten times or more as compared with the power amplifiers using thyristors. While the power amplifiers using transistors can not obtain as large a power as those using thyristors, this disadvantage can be eliminated by a plurality of power amplifiers using transistors and connected in parallel to each other. The motors 70 use brushless motors, for example, in order to prevent the derioration of the maintenance due to increased motors.

In this manner, a plurality of motor torque controllers comprising the torque compensators 92 by the proportional control, the power amplifiers 93 using the commercially available transistors, the motor torque detectors 94 and the motors, for example brushless motors 70 are provided in parallel and one speed compensator 91 and one motor speed detector 8 are added to the motor torque controllers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for cutting a plate into a predetermined size comprising:

knife cylinders for cutting said plate at a selected cut length, said knife cylinders being rotatably driven through a series of rotational angles by a plurality of motors, said motors driving said knife cylinders at a rotational speed;

a reduction gear mechanism for reducing the rotational speed of said motors and for outputting a comprehensive torque from said motors to said knife cylinders;

means for moving the plate toward said knife cylinders at a moving speed;

set means for setting the cut length for the plate and for outputting a cut length command signal;

plate moving speed detection means for detecting the moving speed of said plate and for generating a plate moving speed signal;

knife cylinder rotational angle detection means for detecting the rotational angle of said knife cylinders and for outputting a rotational angle signal;

motor speed command signal generation means for generating a rotational speed command signal in response to the cut length command signal, the plate moving speed signal and the rotational angle signal;

motor speed detection means for detecting the speed of said motors and for outputting a rotational speed detection signal; and speed control means for controlling speed of said motors in response to the rotational speed command signal and said rotational speed detection signal, said speed control means comprising, a speed compensator for receiving the rotational speed command signal from said motor speed command signal generation means and for receiving the rotational speed detection signal from said motor speed detection means, and for outputting a torque command signal, motor torque detectors associated with each of the plurality of motors, said motor torque detectors detecting torque of the associated motor and outputting a torque detection signal in response thereto for its associated motor, torque compensators associated with each of the plurality of motors, said torque compensators receiving said torque command signal from said speed compensator and receiving the torque detection signal for its associated motor and outputting a motor armature voltage command signal in response thereto for its associated motor, and power amplifiers for each of the torque compensators, said power amplifiers receiving said motor armature voltage command signal from its associated torque compensator and for driving the motor associated with its torque compensator in response to the associated motor armature voltage command signal.

2. The apparatus for cutting a plate into a predetermined size as recited in claim 1 wherein said power amplifiers use transistors.

3. The apparatus for cutting a plate into a predetermined size as recited in claim 1 wherein each of the plurality of motors is a brushless motor.

4. The apparatus for cutting a plate into a predetermined size as recited in claim 1 wherein each motor outputs a rotational torque which is input to the reduction gear mechanism, the reduction gear mechanism then outputting said comprehensive torque to drive each of said knife cylinders, said comprehensive torque being a function of the combination of the respective torques of each of said plurality of motors.

5. The apparatus for cutting a plate into a predetermined size as recited in claim 4 wherein more of said motors are provided than said knife cylinders.

6. The apparatus for cutting a plate into a predetermined size as recited in claim 5 wherein two knife cylinders are provided.

* * * * *